(12) United States Patent
Uematsu et al.

(10) Patent No.: US 11,332,382 B2
(45) Date of Patent: May 17, 2022

(54) TITANIUM COMPOUND SOL SOLUTION, COATING FILM USING THE SAME AND MANUFACTURING METHOD THEREOF

(71) Applicant: CANON KABUSHIKI KAISHA, Tokyo (JP)

(72) Inventors: Erika Uematsu, Fukui (JP); Haruna Hatayama, Fukui (JP); Daichi Watanabe, Fukui (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 411 days.

(21) Appl. No.: 16/296,558

(22) Filed: Mar. 8, 2019

(65) Prior Publication Data

US 2019/0202711 A1 Jul. 4, 2019

Related U.S. Application Data

(63) Continuation of application No. PCT/JP2017/029045, filed on Aug. 10, 2017.

(30) Foreign Application Priority Data

Sep. 15, 2016 (JP) .............................. JP2016-180795

(51) Int. Cl.
*C01G 23/00* (2006.01)
*C01G 23/053* (2006.01)
*C09D 1/00* (2006.01)
*B01J 35/00* (2006.01)
*B01J 37/03* (2006.01)
(Continued)

(52) U.S. Cl.
CPC .......... *C01G 23/053* (2013.01); *B01J 21/063* (2013.01); *B01J 35/004* (2013.01); *B01J 37/036* (2013.01); *B01J 37/038* (2013.01); *C01G 23/04* (2013.01); *C09D 1/00* (2013.01); *C01P 2002/02* (2013.01);
(Continued)

(58) Field of Classification Search
None
See application file for complete search history.

(56) References Cited

U.S. PATENT DOCUMENTS 5,853,866 A 12/1998 Watanabe et al.
6,027,797 A 2/2000 Watanabe et al.
(Continued)

FOREIGN PATENT DOCUMENTS

JP 7-501973 A 3/1995
JP 8-108075 A 4/1996
(Continued)

OTHER PUBLICATIONS

JP-2733874-B2—English translation (Year: 1998).*
(Continued)

*Primary Examiner* — Stefanie J Cohen
(74) *Attorney, Agent, or Firm* — Venable LLP

(57) ABSTRACT

The present invention provides a titanium compound sol solution capable of enabling manufacturing of a film high in transparency and having an excellent photocatalyst effect by low-temperature processing, and a coating film using the same. The present invention is a titanium compound sol solution containing a particulate incomplete condensate obtained by condensing an alkoxy titanium, an α-substituted β-diketone, and a solvent.

7 Claims, 1 Drawing Sheet

(51) Int. Cl.
  *B01J 21/06*  (2006.01)
  *C01G 23/04*  (2006.01)

(52) U.S. Cl.
  CPC ...... *C01P 2002/72* (2013.01); *C01P 2004/62* (2013.01); *C01P 2004/64* (2013.01)

(56) References Cited

U.S. PATENT DOCUMENTS

| | | |
|---|---|---|
| 6,210,779 B1 | 4/2001 | Watanabe et al. |
| 6,268,050 B1 | 7/2001 | Watanabe et al. |
| 6,294,246 B1 | 9/2001 | Watanabe et al. |
| 6,294,247 B1 | 9/2001 | Watanabe et al. |
| 7,077,895 B2 * | 7/2006 | Akui ...................... C01G 23/04 106/287.19 |
| 2015/0284257 A1 | 10/2015 | Kotani et al. |

FOREIGN PATENT DOCUMENTS

| | | | |
|---|---|---|---|
| JP | 2733874 B2 * | 3/1998 | ................ C09J 1/00 |
| JP | 2007321057 A * | 12/2007 | |
| JP | 2011008956 A * | 1/2011 | |
| JP | 2013-026243 A | 2/2013 | |
| JP | 2015-199637 A | 11/2015 | |
| WO | 2015/002326 A1 | 1/2015 | |
| WO | 2018/051692 A1 | 3/2018 | |

OTHER PUBLICATIONS

JP-2007321057-A—English translation (Year: 2007).*
JP-2011008956-A—English translation (Year: 2011).*
Notification of Reasons for Refusal in Japanese Patent Application No. 2016-180795 (dated Jul. 2018).
International Search Report in International Application No. PCT/JP2017/029045 (dated Sep. 2017).

* cited by examiner

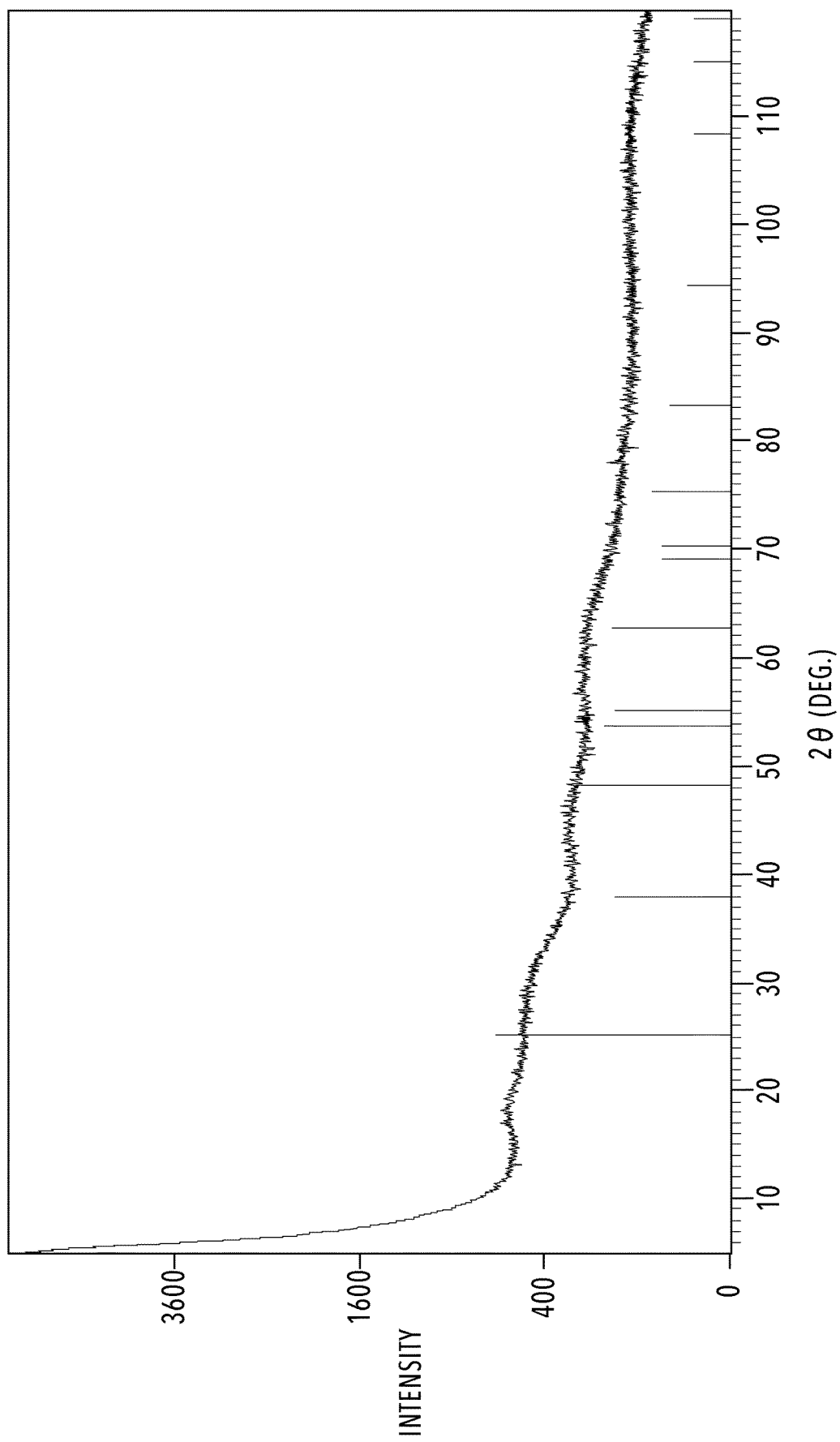

TITANIUM COMPOUND SOL SOLUTION, COATING FILM USING THE SAME AND MANUFACTURING METHOD THEREOF

CROSS-REFERENCE TO RELATED APPLICATIONS

This application is a Continuation of International Patent Application No. PCT/JP2017/029045, filed Aug. 10, 2017, which claims the benefit of Japanese Patent Application No. 2016-180795, filed Sep. 15, 2016, both of which are hereby incorporated by reference herein in their entirety.

BACKGROUND OF THE INVENTION

Field of the Invention

The present invention relates to a titanium compound sol solution capable of enabling manufacturing of a film excellent in transparency and antifouling property, and a coating film using the same.

Background Art

In the field of the solar panel used outdoors, there is a request to prevent fouling of the panel surface and to suppress a reduction in electricity generation efficiency.

For the request such as this, there is an attempt to make use of the photocatalyst effect of a titanium oxide. For example, a method in which coating with an amorphous titanium oxide is performed and then heat is applied to transfer the crystal type to the anatase type (Patent Literature 1), and a technique to form an antifouling layer by coating the panel surface with a solution in which anatase titanium oxide particles are dispersed (Patent Literature 2) are reported.

However, Patent Literature 1 has such a problem that it is necessary to heat the crystal structure of the titanium oxide at 300° C. or higher in order to transfer the crystal structure to the anatase type and for example, in a case where the base material that is coated with the titanium oxide is plastic or soft glass, the substrate melts or deforms. Further, Patent Literature 2 has such a problem that the titanium oxide particle used in Patent Literature 2 has a sub-micron size, and therefore, transparency is poor.

Consequently, an object of the present invention is to provide a titanium compound sol solution capable of enabling manufacturing of a film high in transparency and capable of obtaining an excellent photocatalyst effect even by low-temperature firing, and a coating film using the solution.

CITATION LIST

Patent Literature

PTL 1 Japanese Patent Laid-Open No. H08-108075
PTL 2 Japanese Patent Laid-Open No. 2013-026243

SUMMARY OF THE INVENTION

The inventors of the present invention have made intensive studies in order to solve the above-described problem, and as a result of this, have found that it is possible to solve the above-described problem by configuring a coating solution used to form a coating film capable of obtaining the photocatalyst effect by an incomplete condensate obtained by condensing an alkoxy titanium, an α-substituted β-diketone, and a solvent, and have developed the present invention.

That is, according to the present invention, the coating solution and the coating film as follows are provided.

[1] A titanium compound sol solution containing a particulate incomplete condensate obtained by condensing an alkoxy titanium, an α-substituted β-diketone, and a solvent and a condensation degree of the incomplete condensate is not less than 25% and not more than 70%.

[2] A titanium compound sol solution containing a particulate incomplete condensate obtained by condensing an alkoxy titanium, an α-substituted β-diketone, and a solvent and an average particle diameter of the particulate incomplete condensate is not less than 3 nm and not more than 150 nm as a value found by a dynamic light scattering method in a liquid.

[3] The titanium compound sol solution according to [1], wherein an alkoxy titanium content a [%] and an α-substituted β-diketone content b [%] satisfy relationships of mathematical expression 1 and mathematical expression 2 described below $$3.0 \leq a \leq 33.0 \qquad \text{Mathematical expression 1:}$$

$$a/b \geq 2. \qquad \text{Mathematical expression 2:}$$

[4] The titanium compound sol solution according to [1], wherein the condensation degree of the incomplete condensate is not less 30% and not more 60%.

[5] The titanium compound sol solution according to [1], wherein a difference ($\delta_{solvent}-\delta_{diketone}$) of a solubility parameter ($\delta_{solvent}$) of the solvent from a solubility parameter ($\delta_{diketone}$) of the α-substituted β-diketone is in a range between −2.0 and +2.0 $(J/cm^3)^{1/2}$.

[6] The titanium compound sol solution according to [1], wherein, the solvent contains a solvent whose boiling point is 130° C. or higher by 80% or more for a total solvent amount.

[7] An amorphous titanium oxide coating film formed by the titanium compound sol solution according to [1].

[8] A manufacturing method of an amorphous titanium oxide coating film, the method including: a step of coating a base material with the titanium compound sol solution according to [1]; and a step of heating the base material at a temperature lower than or equal to a glass transition temperature of the base material after the coating.

[9] The manufacturing method according to [8], wherein the heating step is a step of heating the base material at 200° C. or lower.

Further features of the present invention will become apparent from the following description of exemplary embodiments with reference to the attached drawings.

BRIEF DESCRIPTION OF THE DRAWINGS

A FIGURE shows a graph representing amorphous by X-ray diffraction (XRD) measurement.

DESCRIPTION OF THE EMBODIMENTS

In the following, embodiments of the present invention are explained, but the present invention is not limited to the following embodiments.

<Coating Solution>

The present invention relates to a titanium compound sol solution containing a particulate incomplete condensate obtained by condensing an alkoxy titanium, an α-substituted β-diketone, and a solvent. Further, it is possible for a coating film formed by using the titanium compound sol solution of the present invention to exhibit the photocatalyst effect without having an anatase crystal structure that is conventionally required for the photocatalyst effect of a titanium oxide.

[1] Alkoxy Titanium

The alkoxy titanium used for the present invention is represented by formula (1) below.

Ti—(OR)₄    Formula (1)

(in formula (1) described above, R indicates a saturated or unsaturated hydrocarbon group.)

As a specific example of formula (1), mention is made of, for example, a tetramethoxy titanium, a tetraethoxy titanium, a tetra-n-propoxy titanium, a tetra-n-butoxy titanium, and a tetra isobutoxy titanium.

(a) Incomplete Condensate of Alkoxy Titanium

The incomplete condensate of the alkoxy titanium is obtained by hydrolyzing the alkoxy titanium represented by formula (1) described above in the presence of water and alcohol and refers to one in a state where condensation has not reached 100% yet. As the configuration of the condensate, it may also be possible to use one kind of the alkoxy titanium represented by formula (1) described above or a plurality of kinds.

(b) Condensation Degree of Incomplete Condensate

Preferably, the condensation degree of the incomplete condensate in the titanium compound sol solution is not less 25% and not more than 70% and more preferably, not less than 30% and not more than 60%. In a case where the condensation degree is not less than 25% and not more than 70%, it is considered that a structure is likely to be formed that contributes to exhibition of the photocatalyst effect of the coating film. Further, as the physical properties of the coating film, in a case where the condensation degree is 25% or higher, it is likely that a sufficient film strength is obtained. Furthermore, in a case where the condensation degree is lower than or equal to 70%, flexibility of the film after film formation is secured and it is possible to prevent gelling in the state of the solution and to secure film formability.

(c) Particle Diameter of Particulate Incomplete Condensate

The incomplete condensate of the alkoxy titanium is particulate (hereinafter, referred to simply as "particulate incomplete condensate"). Preferably, the average particle diameter of the particulate incomplete condensate in the titanium compound sol solution of the present invention is not less than 3 nm and not more than 150 nm as a value found by the dynamic light scattering method in a liquid, and more preferably, between 3 nm and 50 nm. In a case where the average particle diameter is larger than 3 nm, a structure that exhibits the photocatalyst effect after film formation becomes likely to be formed. Further, also in a case where the average particle diameter is smaller than 150 nm, a structure that exhibits the photocatalyst after film formation is likely to be formed and at the same time, it is also possible to secure transparency of the film by suppressing light scattering.

As a specific average particle diameter measuring method, it is possible to measure the average particle diameter by using FPAR-1000 (manufactured by Otsuka Electronics Co., Ltd., cumulant method analysis) that makes use of laser-light scattering, Nanotrac UPA 250 EX (manufactured by Nikkiso Co., Ltd., the integrated value of 50% of values is used), and so on.

[2] α-Substituted β-Diketone

The α-substituted β-diketone acts as a stabilizer at the time of synthesizing the titanium compound sol by hydrolyzing and condensing the alkoxy titanium and suppresses cohesion of the particulate incomplete condensate. The α-substituted β-diketone is represented by general formula (2) described below and $R^1$, $R^2$, and $R^3$ in the formula are each preferably an alkyl group whose carbon number (number of carbon atoms) is one to three, respectively, and they may be identical with one another or may be different from one another. As an example of the α-substituted β-diketone used for the present invention, mention is made of a 3-methyl-2, 4-pentanedione, 4-methyl-3, 5-heptanedione, a 3, 5-dimethyl-2, 4-hexanedione, a 3-ethyl-2, 4-pentanedione, and so on. In particular, the 3-methyl-2, 4-pentanedione is preferable. In a case where the carbon numbers of $R^1$, $R^2$, and $R^3$ are small, the residual in the film after film formation is avoided and it is possible to obtain favorable optical properties. Further, in a case where the carbon number of one of $R^1$, $R^2$, and $R^3$ is zero, the dispersion stabilization effect of the titanium compound particles in the solution becomes insufficient, and therefore, there is a possibility that the particle diameter of the particulate incomplete condensate becomes large.

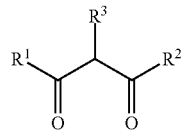
general formula (2)

[3] Solvent

As the solvent used at the time of synthesizing the titanium compound sol used for the coating film of the present invention, preferably the difference ($\delta_{solvent}-\delta_{diketone}$) of the solubility parameter ($\delta_{solvent}$) of the solvent from the solubility parameter ($\delta_{diketone}$) of the α-substituted β-diketone is in a range between $-2.0$ and $+2.0$ $(J/cm^3)^{1/2}$. More preferably, $\delta_{solvent}-\delta_{diketone}$ is in a range between $-0.5$ and $+0.5$ $(J/cm^3)^{1/2}$. In a case where $\delta_{solvent}-\delta_{diketone}$ is between $-2.0$ $(J/cm^3)^{1/2}$ and $+2.0$ $(J/cm^3)^{1/2}$, the solubility of the α-substituted β-diketone and the solvent is good and the α-substituted β-diketone is coordinated effectively for the alkoxy titanium, and therefore, it is possible to prevent the particulate incomplete condensate from becoming coarse and large and to obtain a structure that exhibits the photocatalyst effect.

The solubility parameter ($\delta(J/cm^3)^{1/2}$) of the α-substituted β-diketone and the solvent is a value indicating the solubility of the solvent calculated from the following expression, which is represented as the root square of the cohesive energy density of the α-substituted β-diketone and the solvent.

$$\delta=(\Delta E/V)^{1/2}$$

(in expression, $\Delta E$ is the molar heat of vaporization of the α-substituted β-diketone and the solvent, and V is the molar volume of the α-substituted β-diketone and the solvent)

Generally, there is a case where the molar heat of evaporation or the like is unknown, and therefore, in the present invention, a value calculated from the molecular cohesive energy for each molecular functional group is used. As the method of calculating the solubility parameter ($\delta$) from the molecular cohesive energy of the functional group, mention is made of a method of calculating from an expression $$\delta=(\Delta E/V)^{1/2}=(\Sigma\Delta e_i/\Sigma\Delta v_i)^{1/2}$$

(in expression, ΔE is each molar heat of evaporation, V is each molar volume, $\Delta e_i$ is the evaporation energy (J/mol) of each atomic group, and $\Delta v_i$ is the molar volume (cm³/mol) of each atomic group). The evaporation energy of the atomic group and the molar volume of the atomic group are calculated by using the Fedors value.

Further, in a case where the titanium compound sol of the present invention contains a plurality of solvents, a value obtained by multiplying the mole fraction and the solubility parameter for each solvent and adding all the products of the multiplication was taken to be the solubility parameter.

In detail, the solvent is preferably an organic solvent and it is possible to use an alcohol-based solvent, an aliphatic or alicyclic hydrocarbon-based solvent, various aromatic hydrocarbon-based solvents, various ester-based solvents, various ketone-based solvents, various ether-based solvents, an aprotic polar solvent, and so on. As the solvents such as those, for example, in a case where the α-substituted β-diketone uses the 3-methyl-2, 4-pentanedione, mention is made of a 2-ethyl-1-butanol, a 1-ethoxy-2-propanol, a butyl carbitol, and so on. It may also be possible to use these organic solvents as one kind of solvent or by combining two or more kinds of solvent.

Regarding film formation of a coating film, it is preferable for a solvent whose boiling point at normal pressure is 130° C. or higher to be contained so that the solvent accounts for 80% or more of the total solvent amount. In a case where the ratio of the solvent whose boiling point is 130° C. or higher is 80% or more, the ratio of a solvent whose solvent volatilization speed is high is small, and therefore, it is possible to suppress the occurrence of a defective film at the time of forming a film as a coating film.

[4] Content Ratio of Alkoxy Titanium and α-Substituted β-Diketone

The alkoxy titanium content a [%] in the titanium compound sol solution is preferably not less than 3.0% and not more than 33.0%, and more preferably, not less than 10.0% and not more than 33.0%.

In a case where the content a [%] is 3.0% or more, the ratio of the alkoxy titanium becomes sufficient and it is possible to increase the titanium oxide density in the coating film after film formation to a degree in which it is possible to sufficiently exhibit the photocatalyst effect. Further, in a case where the content a [%] is 33.0% or less, the cohesion of the particulate incomplete condensate is suppressed and it is possible to sufficiently keep the dispersion state in the solution.

Further, it is preferable for the content ratio of the alkoxy titanium content a [%] and the α-substituted β-diketone content b [%] to satisfy an expression below.

$$a/b \geq 2.0$$

In a case where a/b is 2.0, it is possible to form a coating film without a residual of the α-substituted β-diketone in the film after film formation and to avoid the influence on the optical properties of the coating film by the α-substituted β-diketone. Further, in a case where a/b is less than 7.0, the ratio of the α-substituted β-diketone to the alkoxy titanium is sufficiently large for suppressing the cohesion of the particulate incomplete condensate and it is possible to keep the dispersion state in the solution.

<Coating Film>

The present invention also relates to a coating film formed on a base material by using the titanium compound sol solution obtained as described above as another embodiment.

The coating film of the present invention is formed by a method including steps (1) and (2) below.

(1) Step of coating a base material with the titanium compound sol solution (2) Step of heating the base material at a temperature lower than or equal to the glass transition temperature of the base material after the coating (a) Step (1)

The base material that can be used in the present invention is only required to be capable of resisting the heating step at step (2). As the base material used in the present invention, for example, it is possible to use hard glass, soft glass, plastic, semiconductor substrate, such as silicon, metal plate, and so on. Further, it may also be possible to use an inorganic film or the like formed on a semiconductor substrate as a base material and to form a coating film on the surface thereof.

As the coating method at step (1), mention is made of a method of coating a base material with the titanium compound sol solution by a wet process, such as the dipping method, the spin coating method, the spraying method, the printing method, and the flow coating method. The coating method of the titanium compound sol solution is not limited to these methods.

(b) Step (2)

At step (2), it is possible to form a film by causing the condensation reaction of the incomplete condensate in the titanium compound sol solution to progress by heating the base material coated at step (1) to form the titanium oxide and by drying the coated film.

The heating temperature at step (2) is lower than or equal to the glass transition temperature of the base material. Specifically, the heating temperature is preferably 200° C. or lower and more preferably, 100° C. or lower. Further, it is preferable for the coating film formed by the heating to be amorphous (non-crystalline). The definition of "amorphous" in the present specification means that the peak unique to an anatase titanium oxide does not appear by X-ray diffraction (XRD) measurement of the coating film after heating as shown in the FIGURE.

In a case where the heating temperature of the coated film exceeds 200° C., an anatase crystal structure, a rutile crystal structure, or the like appears in the coating film and there is a possibility that transparency of the film is reduced because light scattering increases due to the appearance thereof. Further, in a case where a base material whose melting point is low, such as soda-lime glass, is used, there is a case where the photocatalyst effect is impeded by the influence of component elution.

In general, the photocatalyst effect of the titanium oxide appears in a case where the crystal structure is an anatase type or a rutile type. It is considered preferable to increase crystallinity by adopting the anatase crystal structure. In order to increase crystallinity, heat processing (500° C. or higher) to sinter particles is necessary, but at such a temperature, it is not possible to use a material whose heat resistance is low (for example, plastic and soft glass) as a base material.

In contrast to this, in the present invention, heat processing is performed preferably at 200° C. or lower, and therefore, it is possible to use a material whose heat resistance is low as a base material. Although a film to be obtained is amorphous, it is possible to obtain an excellent photocatalyst effect.

As a heating unit, it is possible to appropriately use an air dryer, a firing furnace, a hot plate, and so on. It may also be possible to perform heating in an inert gas or under reduced pressure. The heating method is not limited to those.

EXAMPLES

In the following, the present invention is explained in more detail by using examples and comparative examples, but the preset invention is not limited by the following examples as long as the gist of the present invention is not exceeded. In a case where the component amount is described by "part" and "%", they are each a mass basis unless specified in particular.

Example 1

<Synthesis of Titanium Compound Sol Solution>

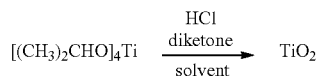

In a reaction vessel equipped with a thermometer, a dropping funnel, and a stirring device, 49.5 parts of a tetra-i-propoxy titanium (alkoxy titanium), 62 parts of the 2-ethyl-1-butanol (solvent), and 6.8 parts of the 3-methyl-2,4-pentanedione (α-substituted β-diketone) were added and they were stirred at 130 rpm. Following this, after dropping a solution that is a mixture of 6.3 parts of a 0.01 N hydrochloric acid (catalyst) and 26 parts of the 1-ethoxy-2-propanol (solvent) by spending 60 minutes while stirring the solution, reaction was made to progress for two hours in an oil bath kept at 100° C. The ratio of the solvent whose boiling point is 130° C. or higher is 100%. Further, the difference $\delta_{solvent} - \delta_{diketone}$) of the solubility parameter ($\delta_{solvent}$) of the solvent of the present example from the solubility parameter ($\delta_{diketone}$) of the α-substituted β-diketone is −0.2 $(J/cm^3)^{1/2}$. The condensation degree of the incomplete condensate in the obtained titanium compound sol solution was measured by the following method.

<Condensation Degree of Incomplete Condensate>

It is possible to calculate the condensation degree of the incomplete condensate in the synthesized titanium compound sol solution by the peak area ratio of each component defined in the following by performing an analysis by $^{47}$Ti-NMR.

Q1 component: titanium atom having one Ti—O—Ti bond
Q2 component: titanium atom having two Ti—O—Ti bonds
Q3 component: titanium atom having three Ti—O—Ti bonds
Q4 component: titanium atom having four Ti—O—Ti bonds In a case where each peak area of each of the above-described components is taken to be [Q1], [Q2], [Q3], and [Q4], it is possible to find the condensation degree by an expression below.

Condensation degree (%)={([Q1]+2×[Q2]+3×[Q3]+4×[Q4])/4}×100

The condensation degree of the incomplete condensate in the titanium compound sol solution of the present example was 55%.

<Manufacturing of Coating Film>

A substrate (slide glass, water edge polishing, material: soda glass, square, 3t×40×40 mm) was subjected to ultrasonic cleaning for 30 minutes with an isopropyl alcohol and after drying, subjected to ozone cleaning for ten minutes and dust was removed by a substrate cleaning spray, and thus, a glass substrate for coating was prepared. On this glass substrate for coating, 0.3 ml of the titanium compound sol solution was subjected to spin coating for 60 seconds at a rotation speed of 2,500 rpm by using the spin coater (product name: "1H-D7" manufactured by Mikasa Co., Ltd.) and the substrate was subjected to firing for two hours in an electric furnace at 100° C.

Example 2

<Synthesis of Titanium Compound Sol Solution>

The titanium compound sol solution was manufactured as in the example 1 described previously except in that the feed amounts were changed to 45 parts of the tetra-i-propoxy titanium (alkoxy titanium) and 5.7 parts of the 0.01 N hydrochloric acid (catalyst). The ratio of the solvent whose boiling point is 130° C. or higher is 100%. Further, $\delta_{solvent} - \delta_{diketone}$ of the present example is −0.20 $(J/cm^3)^{1/2}$. The condensation degree of the incomplete condensate in the titanium compound sol solution was 52%.

<Manufacturing of Coating Film>

The film was formed by the same method as that in the example 1 described previously.

Example 3

<Synthesis of Titanium Compound Sol Solution>

The titanium compound sol solution was manufactured as in the example 1 described previously except in that the feed amounts were changed to 30 parts of the tetra-i-propoxy titanium (alkoxy titanium), 89 parts of the 2-ethyl-1-butanol (solvent), 3.8 parts of the 0.01 N hydrochloric acid (catalyst), and 38 parts of the 1-ethoxy-2-propanol (solvent). The ratio of the solvent whose boiling point is 130° C. or higher is 100%. Further, $\delta_{solvent} - \delta_{diketone}$ of the present example is −0.19 $(J/cm^3)^{1/2}$. The condensation degree of the incomplete condensate in the titanium compound sol solution was 50%.

<Manufacturing of Coating Film>

The film was formed by the same method as that in the example 1 described previously.

Example 4

<Synthesis of Titanium Compound Sol Solution>

In a reaction vessel equipped with a thermometer, a dropping funnel, and a stirring device, 7.5 parts of the tetra-i-propoxy titanium (alkoxy titanium), 94 parts of the 2-ethyl-1-butanol (solvent), and 6.8 parts of the 3-methyl-2,4-pentanedione (α-substituted β-diketone) were added and they were stirred at 130 rpm. Following this, after dropping a solution that is a mixture of 1.0 part of the 0.01 N hydrochloric acid (catalyst) and 40 parts of the 1-ethoxy-2-propanol (solvent) by spending 60 minutes while stirring the solution, reaction was made to progress for two hours in an oil bath kept at 100° C. The ratio of the solvent whose boiling point is 130° C. or higher is 100%. Further, $\delta_{solvent} - \delta_{diketone}$ of the present example is −0.19 $(J/cm^3)^{1/2}$. The condensation degree of the incomplete condensate in the titanium compound sol solution was 44%.

<Manufacturing of Coating Film>

The film was formed by the same method as that in the example 1 described previously.

Example 5

<Synthesis of Titanium Compound Sol Solution>

In a reaction vessel equipped with a thermometer, a dropping funnel, and a stirring device, 4.5 parts of the tetra-i-propoxy titanium (alkoxy titanium), 100 parts of the 2-ethyl-1-butanol (solvent), and 2.3 parts of the 3-methyl-2, 4-pentanedione (α-substituted β-diketone) were added and they were stirred at 130 rpm. Following this, after dropping a solution that is a mixture of 0.6 parts of the 0.01 N hydrochloric acid (catalyst) and 43 parts of the 1-ethoxy-2-propanol (solvent) by spending 60 minutes while stirring the solution, reaction was made to progress for two hours in an oil bath kept at 100° C. The ratio of the solvent whose boiling point is 130° C. or higher is 100%. Further, $\delta_{solvent}-\delta_{diketone}$ of the present example is −0.18 $(J/cm^3)^{1/2}$. The condensation degree of the incomplete condensate in the titanium compound sol solution was 36%.

<Manufacturing of Coating Film>

The film was formed by the same method as that in the example 1 described previously.

Example 6

<Synthesis of Titanium Compound Sol Solution>

The titanium compound sol solution was manufactured as in the example 3 described previously except in that the reaction time was changed to 90 minutes. The condensation degree of the incomplete condensate in the titanium compound sol solution was 27%.

<Manufacturing of Coating Film>

The film was formed by the same method as that in the example 1 described previously.

Example 7

<Synthesis of Titanium Compound Sol Solution>

The titanium compound sol solution was manufactured as in the example 3 described previously except in that the reaction time was changed to 100 minutes. The condensation degree of the incomplete condensate in the titanium compound sol solution was 30%.

<Manufacturing of Coating Film>

The film was formed by the same method as that in the example 1 described previously.

Example 8

<Synthesis of Titanium Compound Sol Solution>

The titanium compound sol solution was manufactured as in the example 3 described previously except in that the reaction time was changed to 150 minutes. The condensation degree of the incomplete condensate in the titanium compound sol solution was 60%.

<Manufacturing of Coating Film>

The film was formed by the same method as that in the example 1 described previously.

Example 9

<Synthesis of Titanium Compound Sol Solution>

The titanium compound sol solution was manufactured as in the example 3 described previously except in that the reaction time was changed to 180 minutes. The condensation degree of the incomplete condensate in the titanium compound sol solution was 65%.

<Manufacturing of Coating Film>

The film was formed by the same method as that in the example 1 described previously.

Example 10

<Synthesis of Titanium Compound Sol Solution>

The titanium compound sol solution was manufactured as in the example 3 described previously except in that the alkoxy titanium was changed to the tetra-n-butoxy titanium. The ratio of the solvent whose boiling point is 130° C. or higher is 100%. Further, $\delta_{solvent}-\delta_{diketone}$ of the present example is −0.19 $(J/cm^3)^{1/2}$. The condensation degree of the incomplete condensate in the titanium compound sol solution was 40%.

<Manufacturing of Coating Film>

The film was formed by the same method as that in the example 1 described previously.

Example 11

<Synthesis of Titanium Compound Sol Solution>

The titanium compound sol solution was manufactured as in the example 3 described previously except in that the α-substituted β-diketone was changed to 6.8 parts of the 3-ethyl-2, 4-pentanedione. The ratio of the solvent whose boiling point is 130° C. or higher is 100%. Further, $\delta_{solvent}-\delta_{diketone}$ of the present example is 0.17 $(J/cm^3)^{1/2}$. The condensation degree of the incomplete condensate in the titanium compound sol solution was 48%.

<Manufacturing of Coating Film>

The film was formed by the same method as that in the example 1 described previously.

Example 12

<Synthesis of Titanium Compound Sol Solution>

In a reaction vessel equipped with a thermometer, a dropping funnel, and a stirring device, 30 parts of the tetra-i-propoxy titanium (alkoxy titanium), 67 parts of the 2-ethyl-1-butanol (solvent), and 6.8 parts of the 3-methyl-2, 4-pentanedione (α-substituted β-diketone) were added and they were stirred at 130 rpm. Following this, after dropping a solution that is a mixture of 3.6 parts of the 0.01 N hydrochloric acid (catalyst) and 40 parts of a 2-propanol (solvent) by spending 60 minutes while stirring the solution, reaction was made to progress for two hours in an oil bath kept at 100° C. The ratio of the solvent whose boiling point is 130° C. or higher is 63%. Further, $\delta_{solvent}-\delta_{diketone}$ of the present example is +1.54 $(J/cm^3)^{1/2}$. The condensation degree of the incomplete condensate in the titanium compound sol solution was 50%.

<Manufacturing of Coating Film>

The film was formed by the same method as that in the example 1 described previously.

Example 13

<Synthesis of Titanium Compound Sol Solution>

The titanium compound sol solution was manufactured as in the example 12 described previously except in that the feed amounts of the solvents were changed to 88 parts of the 2-ethyl-1-butanol (solvent) and 19 parts of the 2-propanol (solvent). The ratio of the solvent whose boiling point is 130° C. or higher is 82%. Further, $\delta_{solvent}-\delta_{diketone}$ of the present example is 1.11 $(J/cm^3)^{1/2}$. The condensation degree of the incomplete condensate in the titanium compound sol solution was 55%.

<Manufacturing of Coating Film>

The film was formed by the same method as that in the example 1 described previously.

Example 14

<Synthesis of Titanium Compound Sol Solution>

In a reaction vessel equipped with a thermometer, a dropping funnel, and a stirring device, 30 parts of a tetra-i-isopropoxy titanium (alkoxy titanium), 94 parts of a 1-butoxy-2-propanol (solvent), and 6.8 parts of the 3-methyl-2,4-pentanedione (α-substituted β-diketone) were added and they were stirred at 130 rpm. Following this, after dropping a solution that is a mixture of 3.6 parts of the 0.01 N hydrochloric acid (catalyst) and 14 parts of a tripropylene glycol monomethyl ether (solvent) by spending 60 minutes while stirring the solution, reaction was made to progress for two hours in an oil bath kept at 100° C. The ratio of the solvent whose boiling point is 130° C. or higher is 100%. Further, $\delta_{solvent} - \delta_{diketone}$ of the present example is +0.48 $(J/cm^3)^{1/2}$. The condensation degree of the incomplete condensate in the titanium compound sol solution was 52%.

<Manufacturing of Coating Film>

The film was formed by the same method as that in the example 1 described previously.

Example 15

<Synthesis of Titanium Compound Sol Solution>

In a reaction vessel equipped with a thermometer, a dropping funnel, and a stirring device, 30 parts of the tetra-i-isopropoxy titanium (alkoxy titanium), 75 parts of a methyl carbitol (solvent), and 6.8 parts of the 3-methyl-2,4-pentanedione (α-substituted β-diketone) were added and they were stirred at 130 rpm. Following this, after dropping a solution that is a mixture of 3.6 parts of the 0.01 N hydrochloric acid (catalyst) and 32.5 parts of the 1-ethoxy-2-propanol (solvent) by spending 60 minutes while stirring the solution, reaction was made to progress for two hours in an oil bath kept at 100° C. The ratio of the solvent whose boiling point is 130° C. or higher is 100%. Further, $\delta_{solvent} - \delta_{diketone}$ of the present example is +2.00 $(J/cm^3)^{1/2}$. The condensation degree of the incomplete condensate in the titanium compound sol solution was 40%.

<Manufacturing of Coating Film>

The film was formed by the same method as that in the example 1 described previously.

Example 16

<Synthesis of Titanium Compound Sol Solution>

In a reaction vessel equipped with a thermometer, a dropping funnel, and a stirring device, 30 parts of the tetra-i-isopropoxy titanium (alkoxy titanium), 64.5 parts of the methyl carbitol (solvent), and 6.8 parts of the 3-methyl-2, 4-pentanedione (α-substituted β-diketone) were added and they were stirred at 130 rpm. Following this, after dropping a solution that is a mixture of 3.6 parts of the 0.01 N hydrochloric acid (catalyst) and 43 parts of the 1-ethoxy-2-propanol (solvent) by spending 60 minutes while stirring the solution, reaction was made to progress for two hours in an oil bath kept at 100° C. The ratio of the solvent whose boiling point is 130° C. or higher is 100%. Further, $\delta_{solvent} - \delta_{diketone}$ of the present example is +1.78 $(J/cm^3)^{1/2}$. The condensation degree of the incomplete condensate in the titanium compound sol solution was 60%.

<Manufacturing of Coating Film>

The film was formed by the same method as that in the example 1 described previously.

Example 17

<Synthesis of Titanium Compound Sol Solution>

In a reaction vessel equipped with a thermometer, a dropping funnel, and a stirring device, 30 parts of the tetra-i-isopropoxy titanium (alkoxy titanium), 54 parts of a butyl acetate (solvent), and 6.8 parts of the 3, 5-dimethyl-2,4-pentanedione (α-substituted β-diketone) were added and they were stirred at 130 rpm. Following this, after dropping a solution that is a mixture of 3.6 parts of the 0.01 N hydrochloric acid (catalyst) and 54 parts of the butyl acetate (solvent) by spending 60 minutes while stirring the solution, reaction was made to progress for two hours in an oil bath kept at 100° C. The ratio of the solvent whose boiling point is 130° C. or higher is 100%. Further, $\delta_{solvent} - \delta_{diketone}$ of the present example is −2.04 $(J/cm^3)^{1/2}$. The condensation degree of the incomplete condensate in the titanium compound sol solution was 56%.

<Manufacturing of Coating Film>

The film was formed by the same method as that in the example 1 described previously.

Example 18

<Synthesis of Titanium Compound Sol Solution>

In a reaction vessel equipped with a thermometer, a dropping funnel, and a stirring device, 30 parts of the tetra-i-isopropoxy titanium (alkoxy titanium), 82 parts of the butyl acetate (solvent), and 6.8 parts of the 3, 5-dimethyl-2,4-hexanedione (α-substituted β-diketone) were added and they were stirred at 130 rpm. Following this, after dropping a solution that is a mixture of 3.6 parts of the 0.01 N hydrochloric acid (catalyst) and 26 parts of the 1-ethoxy-2-propanol (solvent) by spending 30 minutes while stirring the solution, reaction was made to progress for two hours in an oil bath kept at 100° C. The ratio of the solvent whose boiling point is 130° C. or higher is 100%. Further, $\delta_{solvent} - \delta_{diketone}$ of the present example is −0.94 $(J/cm^3)^{1/2}$. The condensation degree of the incomplete condensate in the titanium compound sol solution was 47%.

<Manufacturing of Coating Film>

The film was formed by the same method as that in the example 1 described previously.

Example 19

<Synthesis of Titanium Compound Sol Solution>

The titanium compound sol solution manufactured in the example 3 was used.

<Manufacturing of Coating Film>

The film was formed by the same method as that in the example 1 described previously except in that the heating temperature after film formation was changed to 220° C.

Example 20

<Synthesis of Titanium Compound Sol Solution>

The titanium compound sol solution manufactured in the example 3 was used.

<Manufacturing of Coating Film>

The film was formed by the same method as that in the example 1 described previously except in that the heating temperature after film formation was changed to 200° C.

Example 21

<Synthesis of Titanium Compound Sol Solution>
The titanium compound sol solution manufactured in the example 3 was used.
<Manufacturing of Coating Film>
The film was formed by the same method as that in the example 1 described previously except in that the heating condition after film formation was changed to 80° C. under vacuum decompression.

Example 22

<Synthesis of Titanium Compound Sol Solution>
In a reaction vessel equipped with a thermometer, a dropping funnel, and a stirring device, 3.0 parts of the tetra-i-propoxy titanium (alkoxy titanium), 102 parts of the 2-ethyl-1-butanol (solvent), and 1.5 parts of the 3-methyl-2,4-pentanedione (α-substituted β-diketone) were added and they were stirred at 130 rpm. Following this, after dropping a solution that is a mixture of 0.4 parts of the 0.01 N hydrochloric acid (catalyst) and 44 parts of the 1-ethoxy-2-propanol (solvent) by spending 60 minutes while stirring the solution, reaction was made to progress for two hours in an oil bath kept at 100° C. The ratio of the solvent whose boiling point is 130° C. or higher is 100%. Further, $\delta_{solvent} - \delta_{diketone}$ of the present example is $-0.20$ $(J/cm^3)^{1/2}$. The condensation degree of the incomplete condensate in the titanium compound sol solution was 35%.
<Manufacturing of Coating Film>
The film was formed by the same method as that in the example 1 described previously.

Example 23

<Synthesis of Titanium Compound Sol Solution>
In a reaction vessel equipped with a thermometer, a dropping funnel, and a stirring device, 53 parts of the tetra-i-propoxy titanium (alkoxy titanium), 59 parts of the 2-ethyl-1-butanol (solvent), and 6.8 parts of the 3-methyl-2,4-pentanedione (α-substituted β-diketone) were added and they were stirred at 130 rpm. Following this, after dropping a solution that is a mixture of 6.7 parts of the 0.01 N hydrochloric acid (catalyst) and 25 parts of the 1-ethoxy-2-propanol (solvent) by spending 60 minutes while stirring the solution, reaction was made to progress for two hours in an oil bath kept at 100° C. The ratio of the solvent whose boiling point is 130° C. or higher is 100%. Further, $\delta_{solvent} - \delta_{diketone}$ of the present example is $-0.20$ $(J/cm^3)^{1/2}$. The condensation degree of the incomplete condensate in the titanium compound sol solution was 58%.
<Manufacturing of Coating Film>
The film was formed by the same method as that in the example 1 described previously.

Example 24

<Synthesis of Titanium Compound Sol Solution>
In a reaction vessel equipped with a thermometer, a dropping funnel, and a stirring device, 53 parts of the tetra-i-propoxy titanium (alkoxy titanium), 75 parts of the methyl carbitol (solvent), and 6.8 parts of the 3-methyl-2,4-pentanedione (α-substituted β-diketone) were added and they were stirred at 130 rpm. Following this, after dropping a solution that is a mixture of 6.7 parts of the 0.01 N hydrochloric acid (catalyst) and 25 parts of the methyl carbitol (solvent) by spending 60 minutes while stirring the solution, reaction was made to progress for two hours in an oil bath kept at 100° C. The ratio of the solvent whose boiling point is 130° C. or higher is 100%. Further, $\delta_{solvent} - \delta_{diketone}$ of the present example is $+2.19$ $(J/cm^3)^{1/2}$. The condensation degree of the incomplete condensate in the titanium compound sol solution was 38%.
<Manufacturing of Coating Film>
The film was formed by the same method as that in the example 1 described previously.

Example 25

<Synthesis of Titanium Compound Sol Solution>
In a reaction vessel equipped with a thermometer, a dropping funnel, and a stirring device, 53 parts of the tetra-i-propoxy titanium (alkoxy titanium), 49 parts of a butyl propionate (solvent), and 6.8 parts of the 3-methyl-2,4-pentanedione (α-substituted β-diketone) were added and they were stirred at 130 rpm. Following this, after dropping a solution that is a mixture of 6.7 parts of the 0.01 N hydrochloric acid (catalyst) and 51 parts of the 2-ethyl-1-butanol (solvent) by spending 60 minutes while stirring the solution, reaction was made to progress for two hours in an oil bath kept at 100° C. The ratio of the solvent whose boiling point is 130° C. or higher is 100%. Further, $\delta_{solvent} - \delta_{diketone}$ of the present example is $-2.00$ $(J/cm^3)^{1/2}$. The condensation degree of the incomplete condensate in the titanium compound sol solution was 40%.
<Manufacturing of Coating Film>
The film was formed by the same method as that in the example 1 described previously.

Comparative Example 1

<Synthesis of Titanium Compound Sol Solution>
The titanium compound sol solution was manufactured as in the example 3 described previously except in that an acetic acid was used as a stabilizer in place of the α-substituted β-diketone. A solubility parameter ($\delta_{solvent} - \delta_{acetic\ acid}$) of the solvent for the solubility parameter of the stabilizer of the present example is $-10.31$ $(J/cm^3)^{1/2}$. Further, the condensation degree of the incomplete condensate in the titanium compound sol solution was 55%.
<Manufacturing of Coating Film>
The film was formed by the same method as that in the example 1 described previously.

Comparative Example 2

<Synthesis of Titanium Compound Sol Solution>
In a reaction vessel equipped with a thermometer, a dropping funnel, and a stirring device, 30 parts of the tetra-i-isopropoxy titanium (alkoxy titanium) and 80 parts of the butyl acetate (solvent) were added and they were stirred at 130 rpm. Following this, after dropping a solution that is a mixture of 3.6 parts of the 0.01 N hydrochloric acid (catalyst) and 34 parts of the 1-ethoxy-2-propanol (solvent) by spending 30 minutes while stirring the solution, reaction was made to progress in an oil bath kept at 100° C., but deposition occurred on the way, and therefore, the reaction was aborted.
<Manufacturing of Coating Film>
The film was formed by the same method as that in the example 1 described previously.

Table 1 shows the composition of the titanium compound sol solution

TABLE 1

Composition of titanium compound sol solution

| | Alkoxy titanium | α-substituted β-diketone | Alkoxy titanium content a [%] | β-substituted β-diketone content b [%] | a/b | Solubility parameter α-substituted β-diketone | Solubility parameter solvent | Solubility parameter difference | Condensation degree of incomplete condensate [%] |
|---|---|---|---|---|---|---|---|---|---|
| Example 1 | tetra-i-isopropoxy titanium | 3-methyl-2,4-pentanedione | 33 | 4.5 | 7.3 | 20.78 | 20.58 | −0.20 | 55 |
| Example 2 | ↟ | ↟ | 30 | 4.5 | 6.7 | 20.78 | 20.58 | −0.20 | 52 |
| Example 3 | ↟ | ↟ | 20 | 4.5 | 4.4 | 20.78 | 20.59 | −0.19 | 50 |
| Example 4 | ↟ | ↟ | 5 | 4.5 | 1.1 | 20.78 | 20.59 | −0.19 | 44 |
| Example 5 | ↟ | ↟ | 3 | 1.5 | 2.0 | 20.78 | 20.59 | −0.18 | 36 |
| Example 6 | ↟ | ↟ | 20 | 4.5 | 4.4 | 20.78 | 20.59 | −0.19 | 27 |
| Example 7 | ↟ | ↟ | 20 | 4.5 | 4.4 | 20.78 | 20.59 | −0.19 | 30 |
| Example 8 | ↟ | ↟ | 20 | 4.5 | 4.4 | 20.78 | 20.59 | −0.19 | 60 |
| Example 9 | ↟ | ↟ | 20 | 4.5 | 4.4 | 20.78 | 20.59 | −0.19 | 65 |
| Example 10 | tetra-n-butoxy titanium | ↟ | 20 | 4.5 | 4.4 | 20.78 | 20.59 | −0.19 | 40 |
| Example 11 | tetra-i-isopropoxy titanium | 3-ethyl-2,4-pentanedione | 20 | 4.5 | 4.4 | 20.42 | 20.59 | 0.17 | 48 |
| Example 12 | ↟ | 3-methyl-2,4-pentanedione | 20 | 4.5 | 4.4 | 20.78 | 22.32 | 1.54 | 50 |
| Example 13 | ↟ | ↟ | 20 | 4.5 | 4.4 | 20.78 | 21.89 | 1.11 | 55 |
| Example 14 | ↟ | ↟ | 20 | 4.5 | 4.4 | 20.78 | 21.26 | 0.48 | 52 |
| Example 15 | ↟ | ↟ | 20 | 4.5 | 4.4 | 20.78 | 22.78 | 2.00 | 40 |
| Example 16 | ↟ | ↟ | 20 | 4.5 | 4.4 | 20.78 | 22.56 | 1.78 | 60 |
| Example 17 | ↟ | 3,5-dimethyl-2,4-hexanedione | 20 | 4.5 | 4.4 | 19.83 | 17.80 | −2.04 | 56 |
| Example 18 | ↟ | ↟ | 20 | 4.5 | 4.4 | 19.83 | 18.89 | −0.94 | 47 |
| Example 19 | ↟ | 3-methyl-2,4-pentanedione | 20 | 4.5 | 4.4 | 20.78 | 20.59 | −0.19 | 50 |
| Example 20 | ↟ | ↟ | 20 | 4.5 | 4.4 | 20.78 | 20.59 | −0.19 | 50 |
| Example 21 | ↟ | ↟ | 20 | 4.5 | 4.4 | 20.78 | 20.59 | −0.19 | 50 |
| Example 22 | ↟ | ↟ | 2 | 1 | 2 | 20.78 | 20.58 | −0.20 | 35 |
| Example 23 | ↟ | ↟ | 35 | 4.5 | 7.8 | 20.78 | 20.58 | −0.20 | 58 |
| Example 24 | ↟ | ↟ | 20 | 4.5 | 4.4 | 20.78 | 22.97 | 2.19 | 38 |
| Example 25 | ↟ | ↟ | 20 | 4.5 | 4.4 | 20.78 | 18.70 | −2.00 | 40 |
| Comparative 1 | ↟ | acetic acid | 20 | — | — | 30.90 | 20.59 | −10.31 | 55 |
| Comparative 2 | ↟ | — | 20 | — | — | — | 20.59 | — | — |

(Evaluation 1: Average Particle Diameter of Particulate Incomplete Condensate)

The average particle diameter of the titanium compound sol solution was measured by using the nanoparticle size distribution measuring instrument (product name "UPA-EX250", manufactured by Nikkiso Co., Ltd.) and the average particle diameter immediately after the synthesis and that after six months were evaluated by the following criteria. The results are shown in Table 2.

⊚: In a case where the particle diameter is not less than 5 nm and less than 30 nm ○: In a case where the particle diameter is not less than 30 nm and less than 50 nm Δ: In a case where the particle diameter is not less than 50 nm and less than 80 nm Δx: In a case where the particle diameter is not less than 80 nm and less than 150 nm x: In a case where the particle diameter is more than or equal to 150 nm (Evaluation 2: Contact Angle of Water of Coating Film)

In the photocatalyst function, antifouling due to decomposition of an organic substance and antifouling due to hydrophilicity appear at the same time. Because of this, in this specification, evaluation of whether the photocatalyst performance appeared was performed by evaluating hydrophilicity that is easy to measure. The antifouling due to hydrophilicity is a function to wash off stain by water, such as rainwater, flowing down because hydrophilicity by a hydroxyl group appears on the surface of a titanium oxide coating film due to irradiation with light, and therefore, it is possible for the water formed by hydrogen bonding with the hydroxyl group to lift the stain from the coating surface. Consequently, in order to evaluate the antifouling due to hydrophilicity, measurement of the contact angle of water of the titanium oxide coating film irradiated with light was performed. As the evaluation method, the surface of the formed coating film was irradiated with UV light whose intensity is 1 mW/cm$^2$ for three hours by the UV irradiator (manufactured by Ushio Inc., multi-light basic configuration unit ML-251A/B, irradiation optical unit PM25C-100). After this, pure water drop was dropped onto the coating film and the contact angle was measured by the automatic contact angle meter (CA-VP type, manufactured by Kyowa Interface Science Co., Ltd.) and evaluation was performed by the following criteria. The results were shown in Table 2.

⊚: In a case where the contact angle is less than 10°

○: In a case where the contact angle is not less than 10° and less than 20°

Δ: In a case where the contact angle is less than 20° and less than 30° x: In a case where the contact angle is larger than or equal to 30°

(Evaluation 3: Transmissivity of Coating Film)

The transmissivity at a wavelength of 450 nm was measured at an incidence angle of 0 degrees by using the spectrophotometer UV-Vis (U-3310 manufactured by Hitachi High-Tech Science Corporation) for the substrate alone before coating and the coating film, respectively. In a case where the transmissivity of the base material alone is taken to be $T_0$ and the transmissivity of the coating film is taken to be $T_1$, the transmissivity was evaluated in accordance with the evaluation criteria shown below. Results are shown in Table 2.

⊚: In a case where an attenuation ratio of transmissivity $T_0-T_1$ is less than 1%
○: In a case where the attenuation ratio of transmissivity $T_0-T_1$ is not less than 1% and less than 5%
Δ: In a case where the attenuation ratio of transmissivity $T_0-T_1$ is not less than 5% and less than 10%
x: In a case where the attenuation ratio of transmissivity $T_0-T_1$ is larger or equal to 10%

(Evaluation 4: Film Formability)

The film formability was evaluated in accordance with the evaluation criteria below by observing the external appearance of the coating film by visual inspection and by using the laser microscope VK-9510 (manufactured by Keyence Corporation). Results are shown in Table 2.
○: The coating film is formed uniformly
Δ: There is a difference in film thickness partially
x: There is a portion not coated having an excellent photocatalyst effect even by low-temperature processing. Further, according to the present invention, it is possible to provide an amorphous titanium oxide coating film excellent in transparency and antifouling property.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A titanium compound sol solution containing:
   a particulate incomplete condensate obtained by condensing an alkoxy titanium;

TABLE 2

| | Evaluation results | | | | | | |
|---|---|---|---|---|---|---|---|
| | Titanium compound sol solution | | | | Coating film | | |
| | initial average particle diameter | | average particle diameter after six months | | contact angle of water | transmissivity | film formability |
| Example 1 | 47.0 | ○ | 62.8 | Δ | ○ | ○ | ○ |
| Example 2 | 38.0 | ○ | 45.6 | ○ | ○ | ○ | ○ |
| Example 3 | 5.4 | ⊚ | 8.5 | ⊚ | ⊚ | ⊚ | ○ |
| Example 4 | 34.2 | ○ | 55.6 | ○ | Δ | ⊚ | ○ |
| Example 5 | 16.5 | ⊚ | 28.5 | ○ | Δ | ⊚ | ○ |
| Example 6 | 3.6 | ⊚ | 25.4 | ⊚ | Δ | ⊚ | ○ |
| Example 7 | 4.2 | ⊚ | 20.7 | ⊚ | ○ | ⊚ | ○ |
| Example 8 | 20.5 | ⊚ | 24.9 | ⊚ | ○ | ⊚ | ○ |
| Example 9 | 37.7 | ○ | 47.1 | ○ | Δ | ○ | ○ |
| Example 10 | 15.0 | ⊚ | 20.2 | ⊚ | ○ | ⊚ | ○ |
| Example 11 | 52.9 | Δ | 77.3 | Δ | ○ | ○ | ○ |
| Example 12 | 7.2 | ⊚ | 10.8 | ⊚ | ○ | ○ | Δ |
| Example 13 | 6.9 | ⊚ | 9.1 | ⊚ | ⊚ | ⊚ | Δ |
| Example 14 | 21.5 | ⊚ | 25.7 | ⊚ | ⊚ | ⊚ | ○ |
| Example 15 | 81.2 | Δ | 110.0 | Δ | ⊚ | ○ | Δ |
| Example 16 | 46.7 | ○ | 82.4 | Δ | ○ | Δ | ○ |
| Example 17 | 121.1 | ΔX | 135.0 | ΔX | Δ | Δ | Δ |
| Example 18 | 99.6 | Δ | 111.5 | Δ | Δ | Δ | Δ |
| Example 19 | 5.4 | ⊚ | 8.5 | ⊚ | ⊚ | ○ | ○ |
| Example 20 | 5.4 | ⊚ | 8.5 | ⊚ | ⊚ | ○ | ○ |
| Example 21 | 5.4 | ⊚ | 8.5 | ⊚ | ⊚ | ⊚ | ○ |
| Example 22 | 17.8 | ⊚ | 30.1 | ○ | Δ | ⊚ | ○ |
| Example 23 | 60.2 | Δ | 85.2 | ΔX | ○ | Δ | ○ |
| Example 24 | 120.0 | ΔX | 169.8 | X | Δ | Δ | Δ |
| Example 25 | 75.0 | Δ | 90.1 | ΔX | ⊚ | ○ | ○ |
| Comparative 1 | 170.1 | X | -(precipitation) | X | Δ | X | Δ |
| Comparative 2 | -(precipitation) | X | — | X | X | X | X |

As is obvious from the evaluation results shown in Table 2, the particle diameter of the particulate incomplete condensate of the titanium compound sol solution of the examples 1 to 25 is small and the titanium compound sol solution is excellent in dispersion stability. Further, the film formability of the titanium compound sol solution in the examples 1 to 25 is favorable and it was possible to form an optical film excellent in transparency and antifouling property.

By using the titanium compound sol solution of the present invention, it is possible to provide a titanium oxide coating film high in transparency and bringing about an excellent photocatalyst effect even by low-temperature firing.

According to the present invention, it is possible to provide a titanium compound sol solution capable of enabling manufacturing of a film high in transparency and an α-substituted β-diketone; and
a solvent,
wherein a condensation degree of the incomplete condensate is 30% to 60%,
wherein a difference ($\delta_{solvent}-\delta_{diketone}$) between a solubility parameter $\delta_{solvent}$ of the solvent and a solubility parameter ($\delta_{diketone}$) of the α-substituted β-diketone calculated using an expression (1) is −2.0 to +2.0 $(J/cm^3)^{1/2}$:

$$\delta=(\Sigma\Delta e_i/\Sigma\Delta v_i)^{1/2}, \quad \text{expression (1)}$$

where $\Delta e_i$ is an evaporation energy (J/mol) of each atomic group, and $\Delta v_i$ is a molar volume ($cm^3$/mol) of each atomic group, and the evaporation energy and the molar volume of the atomic group are calculated by using a Fedors value, and
wherein an average particle diameter of the particulate incomplete condensate is 3 nm to 150 nm as measured by a dynamic light scattering method in a liquid.

2. The titanium compound sol solution according to claim 1, wherein an alkoxy titanium content a [%] and an α-substituted β-diketone content b [%] satisfy relationships:

$3.0 \leq a \leq 33.0$; and $a/b \geq 2.0$.

3. The titanium compound sol solution according to claim 1, wherein the solvent contains a solvent whose boiling point is 130° C. or higher by 80% or more for a total solvent amount.

4. The titanium compound sol solution according to claim 1, wherein the solvent is at least one selected from the group consisting of 1-ethoxy-2-propanol, butyl carbitol, tripropylene glycol monomethyl ether, methyl carbitol, and butyl propionate.

5. An amorphous titanium oxide coating film formed by the titanium compound sol solution according to claim 1.

6. A manufacturing method of an amorphous titanium oxide coating film, the method comprising:
   a step of coating a base material with the titanium compound sol solution according to claim 1; and
   a step of heating the base material at a temperature lower than or equal to a glass transition temperature of the base material after the coating.

7. The manufacturing method according to claim 6, wherein the heating step is a step of heating the base material at 200° C. or lower.

* * * * *